(12) United States Patent
Gelfer et al.

(10) Patent No.: US 11,746,265 B2
(45) Date of Patent: Sep. 5, 2023

(54) TWO-COMPONENT ADHESIVE COMPOSITIONS AND METHODS OF MAKING SAME

(71) Applicant: Dow Global Technologies LLC, Midland, MI (US)

(72) Inventors: Mikhail Y. Gelfer, Sugarland, TX (US); Rui Xie, Pearland, TX (US); Jonathan Barrus, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 121 days.

(21) Appl. No.: 16/316,912

(22) PCT Filed: May 22, 2017

(86) PCT No.: PCT/US2017/033724
§ 371 (c)(1),
(2) Date: Jan. 10, 2019

(87) PCT Pub. No.: WO2018/013222
PCT Pub. Date: Jan. 18, 2018

(65) Prior Publication Data
US 2019/0241780 A1 Aug. 8, 2019

Related U.S. Application Data

(60) Provisional application No. 62/360,686, filed on Jul. 11, 2016.

(51) Int. Cl.
| C09J 175/08 | (2006.01) |
| C08G 18/48 | (2006.01) |
| C08G 18/76 | (2006.01) |
| C08G 18/10 | (2006.01) |
| C09J 5/06 | (2006.01) |

(52) U.S. Cl.
CPC ............ C09J 175/08 (2013.01); C08G 18/10 (2013.01); C08G 18/4854 (2013.01); C08G 18/7671 (2013.01); C09J 5/06 (2013.01); C09J 2475/00 (2013.01)

(58) Field of Classification Search
CPC .................................................... C09J 175/08
See application file for complete search history.

(56) References Cited

U.S. PATENT DOCUMENTS

| 4,870,150 | A | 9/1989 | Bandlish et al. |
| 2009/0012258 | A1* | 1/2009 | Shimoma ............... C09J 175/04 528/53 |
| 2010/0242798 | A1* | 9/2010 | Terada .................... C08G 18/10 106/287.1 |
| 2010/0261563 | A1 | 10/2010 | Verbeke et al. |
| 2012/0289648 | A1* | 11/2012 | Spyrou ................ C09D 175/06 524/558 |
| 2013/0288060 | A1* | 10/2013 | Pind .................... C08G 18/6629 428/423.1 |
| 2014/0184270 | A1 | 7/2014 | Jaussi et al. |
| 2016/0053147 | A1* | 2/2016 | Kelch .................. C08G 18/324 156/331.4 |

FOREIGN PATENT DOCUMENTS

| EP | 0136396 | 4/1985 |
| JP | 03678325 | 8/2005 |

OTHER PUBLICATIONS

PCT/US2017/033724, International Search Report and Written Opinion dated Aug. 11, 2017.
PCT/US2017/033724, International Preliminary Report on Patentability dated Jan. 15, 2019.

* cited by examiner

*Primary Examiner* — Daniel H Lee
(74) *Attorney, Agent, or Firm* — Boyle Fredrickson, S.C.

(57) ABSTRACT

A solvent-based two-component adhesive composition is disclosed. The adhesive composition comprises an isocyanate component and a polyol component. One or both of the isocyanate component and polyol component comprises at least one butylene oxide-based polyol. The at least one butylene oxide-based polyol can be selected from the group consisting of a polybutylene oxide polyols, polybutylene oxide-propylene oxide copolymer polyols, polybutylene oxide-polyethylene oxide copolymer polyols, and combinations of two or more thereof. A method for forming a laminate is also disclosed. The method comprises forming an adhesive composition, the composition comprising at least one polyol comprising at least one butylene oxide-based polyol, applying a layer of the adhesive composition to a surface of a film, bringing the layer into contact with a surface of another film to form a laminate, and curing the adhesive composition. A laminate formed by this method is also disclosed.

11 Claims, No Drawings

TWO-COMPONENT ADHESIVE COMPOSITIONS AND METHODS OF MAKING SAME

REFERENCE TO RELATED APPLICATIONS

The present application claims the benefit of U.S. Provisional Application No. 62/360,686, filed on Jul. 11, 2016.

FIELD OF THE DISCLOSURE

The instant disclosure related to adhesive compostions. More particularly, the disclosure relates to two-component adhesive compositions for use with laminate films, the compositions having improved chemical and thermal resistance as well as hydrolytic stability, and methods of making the same.

BACKGROUND AND SUMMARY OF THE DISCLOSURE

Adhesive compositions are useful for a wide variety of purposes. For instance, adhesive compositions are used to bond together substrates such as polyethylenes, polypropylenes, polyesters, polyamides, metals, papers, or cellophane to form composite films, i.e., laminates. The use of adhesives in different laminating end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Within the category of solvent-based laminating adhesives, there are many varieties. One particular variety includes two-component polyurethane-based laminating adhesives. Typically, a two-component polyurethane-based laminating adhesive includes a first component comprising an isocyanate and/or a polyurethane prepolymer and a second component comprising one or more polyols. A polyurethane prepolymer can be obtained by the reaction of a polyisocyanate with a polyether polyol and/or polyester polyol. The second component is a polyether polyol and/or a polyester polyol. Each component can optionally include one or more additives. Common solvents used in such systems include methyl ethyl ketone, ethyl acetate, toluene and the like, all of which must be moisture-free to prevent premature reaction of the isocyanate groups of the polyurethane.

The two components are combined in a predetermined ratio, thereby forming an adhesive composition. The adhesive composition, carried in a solvent, is then applied on a film/foil substrate. The solvent is evaporated from the applied adhesive composition. Another film/foil substrate is then brought into contact with the other substrate, forming a curable laminate structure. The laminate structure is cured to bond the two substrates together. Solvent-based laminating adhesives tend to exhibit good early adhesive strength, known in the art as "green strength," due to the high viscosity of the dry but yet uncured adhesive composition.

Key considerations for solvent-based adhesives include chemical and thermal resistance as well as hydrolytic stability. These considerations are particularly important when the adhesives are used in food packaging, such as hot fill and retort applications. Conventional polyether and/or polyester-based polyurethane adhesives exhibit less desirable performance in these applications due to the inherent shortcomings of the polyether and polyester backbones. Polyether polyols often suffer from poor chemical and heat resistance, though the polyether linkage is more resistant to moisture than polyester linkages. On the other hand, although polyester polyols demonstrate greater chemical and heat resistance, they often suffer from poor hydrolysis resistance especially at elevated temperatures.

Therefore, two-component polyurethane-based laminating adhesive compositions with improved chemical, and thermal resistance as well as hydrolytic stability, and methods of making same, are desirable.

A solvent-based two-component adhesive composition is disclosed. The adhesive composition comprises an isocyanate component comprising at least one isocyanate. The at least one isocyanate can be selected from the group consisting of an isocyanate prepolymer, an isocyanate monomer, a polyisocyanate (e.g., dimers, trimmers, etc.), and combinations of two or more thereof.

The adhesive composition further comprises a polyol component comprising at least one butylene oxide-based polyol. The at least one butylene oxide-based polyol can be selected from the group consisting of a polybutylene oxide polyols, polybutylene oxide-propylene oxide copolymer polyols, polybutylene oxide-polyethylene oxide copolymer polyols, and combinations of two or more thereof. Inclusion of the at least one butylene oxide-based polyol improves the chemical, and thermal resistance as well as hydrolytic stability of the disclosed adhesive compositions relative to existing two-component adhesive compositions.

A method for forming a laminate is also disclosed. The method comprises forming an adhesive composition, the composition comprising at least one polyol comprising at least one butylene oxide-based polyol, applying a layer of the adhesive composition to a surface of a film, bringing the layer into contact with a surface of another film to form a laminate, and curing the adhesive composition. A laminate formed by this method is also disclosed.

DETAILED DESCRIPTION OF THE DISCLOSURE

The two-component adhesive composition according to this disclosure comprises an isocyanate component and a polyol component. The components can be mixed to form an adhesive composition.

Isocyanate Component

The isocyanate component comprises at least one isocyanate. The isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups.

Further, the at least one isocyanate can be selected from the group consisting of aromatic polyisocyanates, aliphatic polyisocyanates, cycloaliphatic polyisocyanates, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Suitable aromatic polyisocyanates include, but are not limited to, 1,3- and 1,4-phenylene diisocyanate, 1,5-naphthylene diisocyanate, 2,6-tolulene diisocyanate, 2,4-tolulene diisocyanate (2,4-TDI), 2,4'-diphenylmethane diisocyanate (2,4'-MDI), 4,4'-diphenylmethane diisocyanate (4,4'-MDI), 3,3'-Dimethyl-4,4'-Biphenyldiisocyanate (TODI), polymeric isocyanates, and combinations of two or more thereof.

Suitable aliphatic polyisocyanates have 3 to 16 carbon atoms, or 4 to 12 carbon atoms, in the linear or branched alkylene residue. Suitable cycloaliphatic or cycloaliphatic diisocyanates advantageously have 4 to 18 carbon atoms, preferably 6 to 15 carbon atoms, in the cycloalkylene residue. Those skilled in the art adequately understand cycloaliphatic diisocyanates simultaneously to mean cyclically and aliphatically bound NCO groups, such as isophorone diisocyanate. In contrast to this, cycloaliphatic diisocyanates are understood to mean those which only have NCO groups directly bound to the cycloaliphatic ring, e.g., $H_{12}MDI$.

Examples of aliphatic and cycloaliphatic polyisocyantes include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane ($H_{12}MDI$), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and mixtures of the above.

Additional isocyanates, such as 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, and 1,4-diisocyanato-4-methyl-pentane are also suitable for use according to this disclosure.

Polyurethane prepolymers for use according to this disclosure consist reaction products of a polyisocyanate and an isocyanate reactive component at a stoichiometric ratio (NCO/OH) greater than 1.5, or between 2 to 6, or between 2.5 to 4. The polyisocyanate is selected from aromatic isocyanates, aliphatic isocyanates, and cycloaliphatic isocyanate. Suitable compounds that can react with polyisocyanates to form polyurethane prepolymers include compounds with hydroxyl groups, amino groups, and thio groups. The isocyanate reactive component can comprise from 5 to 100 weight percent of one or more butylene oxide-based polyols, based on the total weight of the isocyanate reactive component. Examples of the compounds include polyesters, polycaprolactones, polyethers, polyacrylates, polycarbonates polyols, and combinations of two or more thereof. The average hydroxyl number for the isocyanate reactive component can be from 5 to 2,000 mg KOH/g and an average molar mass from 62 to 20,000 g/mol. Preferably, the average OH number of the isocyanate reactive component is from 14 to 850 mg KOH/gram, and more preferably from 56 to 500 mg KOH/gram, most preferably from 110 to 450. The average functionality of the isocyanate reactive component can be from 1 to 6, or from 1.8 to 4, or from 2 to 3. The average molecular weight of the polyol component can be from 25 to 12,000 g/mol, or from 250 to 6,000 g/mol, or from 350 to 3,000 g/mol.

Compounds having polyisocyanate groups, such as the isocyanate prepolymer of the isocyanate component, may be characterized by the parameter "% NCO," which is the amount of polyisocyanate groups by weight based on the weight of the compound. The parameter % NCO is measured by the method of ASTM D 2572-97(2010). The disclosed isocyanate component has a % NCO of at least 3 wt %, or at least 5 wt %, or at least 7 wt %. In some embodiments, the isocyanate component has a % NCO not to exceed 30 wt %, or 25 wt %, or 22 wt %, or 19 wt %.

In some embodiments, the isocyanate component has viscosity at 25° C. of 300 mPa-s to 20,000 mPa-s, as measured by the method of ASTM D2196.

The isocyanate component can, optionally, comprise one or more catalysts. Examples of the at least one catalyst suitable for use according to this disclosure include, but are not limited to, dibutyltin dilaurate, zinc acetate, 2,2-dimorpholinodiethylether, and combinations thereof.

Polyol Component

The adhesive composition further comprises a polyol component comprising at least one butylene oxide-based polyol. The at least one butylene oxide-based polyol can be selected from the group consisting of polybutylene oxide homopolymer polyols, polybutylene oxide-polypropylene oxide copolymer polyols, polybutylene oxide-polyethylene oxide copolymer polyols, and combinations of two or more thereof.

Polybutylene oxide based polyols suitable for use according to this disclosure include, but are not limited to, polybutylene oxide homopolymer polyols, polybutylene oxide-polypropylene oxide copolymer polyols, and polybutylene oxide-polyethylene oxide copolymer polyols having a molecular weight from 150 g/mol to 12.000 g/mol and functionality from 1.0 to 6.0, preferably with molecular weight from 250 to 4000 g/mol and functionality from 2.0 to 4.0, and most preferably with molecular weight from 350 to 2000 and functionality from 2.0 to 3.0. The copolymer polyols based on polybutylene-oxide and polypropylene oxide and polybutylene-polyethylene oxide can contain 10% to 100% of polybutylene oxide, preferably 30% to 100% polybutylene oxide, and most preferably 50% to 100 wt % of polybutylene oxide.

In some embodiments, at least one butylene oxide-based polyol can be only in the isocyanate component, e.g., as a reactant for producing the prepolymer as discussed above. In other embodiments, at least one butylene oxide-based polyol can be only in the polyol component, as discussed above. In still other embodiments, at least one butylene oxide-based polyol can be in both the isocyanate component and the polyol component. When in both components, the butylene oxide-based polyols in each respective component can be the same type of butylene oxide-based polyol or different types of butylene oxide-based polyols.

In some embodiments, the stoichiometric ratio of the isocyanate component to the polyol component is 1:1 or higher, such as 1.2:1 or higher, or such as 1.4:1 or higher. In other embodiments, the stoichiometric ratio of the isocyanate component to the polyol component is 2.5:1 or lower, such as 2:1 or lower, or such as 1.8:1 or lower. In general, the ratio of isocyanate component to polyol component for industrial applications (e.g., pipes) can be relatively higher than the ratio for consumer goods applications (e.g., food packaging) where migration of isocyanate from adhesives to food is a safety concern.

In some embodiments, a solvent can be incorporated into the adhesive composition to form a solvent-based adhesive. Examples of solvents suitable for use according to this disclosure include ethyl acetate, methyl ethyl ketone, toluene, and combinations of two or more thereof.

In some embodiments, one or more additives can optionally be included in the adhesive composition. Examples of such additives include, but are not limited to, tackifiers, plasticizers, rheology modifiers, adhesion promoters, antioxidants, fillers, colorants, surfactants, catalysts, solvents, and combinations of two or more thereof.

In some embodiments, one or more catalysts can optionally be included in the adhesive composition.

Adhesive Composition Formulation

It is contemplated that the isocyanate component and the polyol component of the disclosed adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to put it in a liquid state. A layer of the composition is applied to a surface of a film. A "film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. In some embodiments, the thickness of the layer of the curable mixture is 1 to 5 μm.

In some embodiments, a surface of another film is brought into contact with the layer of the curable mixture to form an uncured laminate. In some embodiments, the uncured laminate is made at a time when the amount of unreacted polyisocyanate groups present in the adhesive composition is, on a molar basis compared to the amount of polyisocyanate groups present in the isocyanate component prior to contact with the polyol component, at least 50%, or at least 75%, or at least 90%. The uncured laminate is further made at a time when the amount of unreacted polyisocyanate groups present in the curable mixture is less than 100%, or less than 97%, or less than 95%.

The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymer, and metalized polymer films. Films optionally have a surface on which an image is printed with ink. The ink may be in contact with the adhesive composition. In some embodiments, the films are polymer films and metal-coated polymer films, more preferred are polymer films.

EXAMPLES OF THE DISCLOSURE

The present disclosure will now be explained in further detail by Illustrative Examples and Comparative Examples (collectively, "the Examples"). However, the scope of the present disclosure is not, of course, limited to the formulations set forth in the examples. Rather, the Examples are merely illustrative of the disclosure.

Bond Strength Measurement

A 90° T-peel test is performed on laminate samples cut to 15 mm or 25.4 mm (1 inch) wide strips and pulled on a Thwing Albert™ QC-3A peel tester equipped with a 50N loading cell at a rate of 10 inch/min on 1 inch strips. When the two films forming the laminate separate, i.e., peel, the average of the force during the pull is recorded. If one of the films stretches or breaks, the maximum force or force at break is recorded. The value recorded is the average of testing performed on three separate laminate samples.

The failure mode ("FM") or mode of failure ("MOF") is recorded as follows: "FS" indicates a film that stretches; "FT" indicates a film that tears or breaks; "AF" indicates adhesive failure, wherein adhesive on a primary film fails to adhere to a secondary film; "AT" indicates adhesive transfer, wherein adhesive fails to adhere to the primary film and is transferred to the secondary film; "AS" indicates adhesive split or cohesive failure, wherein adhesive is found on both primary and secondary film; "MT" indicates transfer of metal from a metalized film to a secondary film ("PMT" indicates partial metal transfer).

The initial bonds, or "green" bonds, are tested as soon as possible after the laminate is made. Additional T-peel tests are conducted at time intervals as indicated below, such as after one day and after seven days.

Boil-in-Bag Test Procedure

Laminates are made from the "prelam" film, Prelam A1, and GF-19, as well as 92-LBT and GF-19, as described above. A 9"×12" (23 cm×30.5 cm) sheet of laminate is folded over to give a double layer of about 9"×6" (23 cm×15.25 cm) such that the polyethylene film of one layer is in contact with the polyethylene film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kPa (40 psi). More than one pouch is made for each test.

The pouches are filled through the open side with 100±5 ml of "1:1:1 sauce" (blend of equal parts by weight of ketchup, vinegar, and vegetable oil). During filling, splashing the sauce onto the heat seal area is avoided as this can cause the heat seal to fail during the testing. After filling, the top of the pouch is sealed in a manner that minimizes air entrapment inside of the pouch.

The seal integrity is inspected on all four sides of each pouch to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

A pot is filled two-thirds full with water which is brought to a rolling boil. After boiling is achieved, the pot is covered with a lid to minimize water and steam loss. The pot is observed during the test to ensure that there is enough water present to maintain boiling. The pouches are placed in the boiling water and kept boiling for thirty minutes. The pouches are removed and the extent of tunneling, blistering, de-lamination, and/or leakage is compared with the marked preexisting flaws, if any. The observations are recorded. The pouches are then cut open, emptied, and rinsed with soap and water. One or more 1" (2.54 cm) strips are cut from the pouches and the laminate bond strength is measured according to the standard bond strength test described previously. This is done as soon as possible after removing the pouch contents. The interiors of the pouches are examined and any other visual defects are recorded.

Softener Test Procedure

Laminates are made from the "prelam" film, Prelam A1 and GF-19, as well as 92-LBT and GF-19 that was described above. One of the 9"×12" (23 cm×30.5 cm) sheets of laminate is folded over to create a double layer of about 9"×6" (23 cm×15.25 cm) such that the polyethylene film of one layer is in contact with the polyethylene film of the other layer. The edges are trimmed on a paper cutter to give a folded piece of about 5"×7" (12.7×17.8 cm). Two long sides and one short side are heat sealed at the edges to give a finished pouch with an interior size of 4"×6" (10.2 cm×15.2 cm). The heat sealing is carried out at 177° C. (350° F.) for one second at a hydraulic pressure of 276 kPa (40 psi). More than one pouch is made for each test.

The pouches are filled through the open side with 100±5 ml of softener purchased from a supermarket, this instance Purex Mountain Breeze Ultra made by The Dial Corporation, a Henkel Company. After filling, the top of the pouch is sealed in a manner that minimizes air entrapment inside of the pouch.

The seal integrity is inspected on all four sides of the pouches to ensure that there are no flaws in the sealing that could cause the pouch to leak during testing. Any suspect pouches are discarded and replaced with pouches acceptable for testing. In some instances, flaws in the laminate are marked to identify whether new, additional flaws are generated during the testing.

The pouches are then placed in a convection oven preset at 65° C. After aging at the temperature for thirty days, the pouches are removed and the extent of tunneling, blistering, de-lamination, and/or leakage was compared with the marked preexisting flaws, if any. The observations are recorded. The pouches are then cut open, emptied, and rinsed with soap and water. One or more 1" (2.54 cm) strips are cut from the pouches and the laminate bond strength is measured according to the standard bond strength test described previously. This is done as soon as possible after removing the pouch contents. The interior of the pouches are examined and any other visual defects are recorded.

Composition Preparation

Some of the raw materials used to prepare the Examples are identified in Table 1 below by name and commercial supplier.

TABLE 1

Raw Materials

| Name | Description | Commercial Supplier |
|---|---|---|
| ADCOTE ™ L76-205 | 4.2% NCO prepolymer with 75% solids content in ethyl acetate | The Dow Chemical Company |
| ADCOTE ™ L86-116 | Polyester polyol based on phthalic anhydride with 75% solids content in ethyl acetate solvent | The Dow Chemical Company |
| ADCOTE ™ L796 | Isocyanate prepolymer with 85% solids content in ethyl acetate solvent | The Dow Chemical Company |
| ADCOTE ™ 88X102 | Polyester polyol with 80% solids content in ethyl acetate solvent | The Dow Chemical Company |
| ISONATE ™ 125m | 4,4'-methylenediphenyl diisocyanate | The Dow Chemical Company |
| VORAPEL ™ T5001 | Copolymer of polybutylene oxide and polypropylene oxide with average molecular weight of 600 g/mol | The Dow Chemical Company |
| VORAPEL ™ D3201 | Copolymer of polybutylene oxide and polypropylene oxide with average molecular weight of 2,000 g/mol | The Dow Chemical Company |
| VORANOL ™ CP 450 | Glycerine propoxylated polyether triol with average molecular weight of 450 g/mol | The Dow Chemical Company |
| 92-LBT Film | Polyethylene terephthalate film having thickness of 24 mm | E. I. du Pont de Nemours and Company |
| Prelam AL Film | Polyethylene terephthalate film having thickness of 12 mm laminated to soft lamination grade AMCOR ™ aluminum foil having thickness of 9 mm with ADCOTE ™ 550/COREACTANT F | AMPAC Company |
| GF-19 Film | Polyethylene sealant film containing slip additives | Berry Plastics Corporation |
| FT 600-92 g | Metalized poly(ethylene glycol-terephthalate) film having thickness of 23 mm and a 0.02 mm aluminum layer on the PET side | FILMtech Inc. |

TABLE 1-continued

| Raw Materials | | |
|---|---|---|
| Name | Description | Commercial Supplier |
| EMBLEM ™ 1500 | Polyamide film having thickness of 20 mm | E. I. du Pont de Nemours and Company |

Examples IE1, IE2, and CE1 are formulated by combining an isocyanate component, e.g., isocyanate prepolymer, together with a polyol component, e.g., a compound having hydroxyl groups together in a solvent. These examples are prepared according to the formulations listed in Table 2. The formulations in Table 2 are shown in grams of each component.

TABLE 2

| IE1, IE2, and CE1 Compositions (g) | | | |
|---|---|---|---|
| Raw Material | IE1 | IE2 | CE1 |
| ADCOTE ™ L76-205 | 100 | 100 | 100 |
| VORAPEL ™ T5001 | 10 | 10 | — |
| VORANOL ™ CP 450 | — | — | 7.5 |
| Ethyl Acetate | 60 | 60 | 57.5 |
| Substrates | Prelam AL/GF-19 | 92-LBT/GF-19 | Prelam AL/GF-19 |

Illustrative Example 1 ("IE1")

100 grams of ADCOTE™ L76-205, 10 grams of VORAPEL™ T5001, and 60 grams of ethyl acetate are mixed to obtain a 50 percent solid solution. The solution is then applied to a pre-laminated aluminum foil film (Prelam AL) at a coat weight of 1.7 lb/ream, and followed by laminating it with a low density polyethylene film (GF-19) using a NORDMECCANICA™ LABO COMBI™ pilot laminator. Bond strength of the laminate structure is measured immediately after the lamination (green bond) and in intervals of one day, seven days, and fourteen days after the lamination according to the test protocol described earlier. After fourteen days, pouches are made using the laminate structure. The pouches are filled with a mixture consisting of 1 part of oil, 1 part of ketchup, and 1 part of vinegar. The pouches are then boiled in water at 100° C. for thirty minutes (boil-in-bag) before they are cut open, washed clean, and examined for failure modes. Bond strength of the laminate after the boil-in-bag treatment is measured and recorded. Results on bond strength and failure mode of the laminate structure are summarized in Table 3.

Illustrative Example 2 ("IE2")

100 grams of ADCOTE™ L76-205, 10 grams of VORAPEL™ T5001, and 60 grams of ethyl acetate are mixed to obtain a 50 percent solid solution. The solution is then applied to a polyethylene terephthalate film (92-LBT) at a coat weight of 1.7 lb/ream, and followed by laminating it with a low density polyethylene film (GF-19) using a NORDMECCANICA™ LABO COMBI™ pilot laminator. Bond strength of the laminate structure is measured immediately after the lamination (green bond) and in intervals of one day, seven days, and fourteen days after the lamination according to the test protocol described earlier. After fourteen days, pouches are made using the laminate structure. The pouches are filled with a mixture consisting of 1 part of oil, 1 part of ketchup, and 1 part of vinegar. The pouches are then boiled in water at 100° C. for thirty minutes (boil-in-bag) before they are cut open, washed clean, and examined for failure modes. Bond strength of the laminate after the boil-in-bag treatment is measured and recorded. Results on bond strength and failure mode of the laminate structure are summarized in Table 3.

Comparative Example 1 ("CE1")

100 grams of ADCOTE™ L76-205, 7.5 grams of VORANOL™ CP 450, and 57.5 grams of ethyl acetate are mixed to obtain a 50% solid solution. The solution is then applied to a pre-laminated aluminum foil film (Prelam AL) at a coat weight of 1.7 lb/ream, and followed by laminating it with a low density polyethylene film (GF-19) using a NORDMECCANICA™ LABO COMBI™ pilot laminator. Bond strength of the laminate structure is measured immediately after the lamination (green bond) and in intervals of one day, seven days, and fourteen days after the lamination according to the test protocol described earlier. After fourteen days, pouches are made using the laminate structure. The pouches are filled with a mixture consisting of 1 part of oil, 1 part of ketchup, and 1 part of vinegar. The pouches are then boiled in water at 100° C. for thirty minutes (boil-in-bag) before they are cut open, washed clean, and examined for failure modes. Bond strength of the laminate after the boil-in-bag treatment is measured and recorded. Results on bond strength and failure mode of the laminate structure are summarized in Table 3.

TABLE 3

| Performance Results for IE1, IE2, and CE1 | | | | | | |
|---|---|---|---|---|---|---|
| | IE1 | | IE2 | | CE1 | |
| | Bond Strength (g/inch) | Failure Mode | Bond Strength (g/inch) | Failure Mode | Bond Strength (g/inch) | Failure Mode |
| Green Bond | 84 | AS | 82 | AS | 325 | AS |
| 1-day Bond | 1606 | FT | 1602 | FT | 1462 | FS |
| 7-day Bond | 1548 | FT | 1895 | FT | 1659 | FS |
| 14-day Bond | 1649 | FT | 1802 | FT | 1697 | FS |
| Boil-In-Bag | | | | | | |
| Appearance | No Tunneling | | No Tunneling | | Tunneling | |
| Bond | 842 | AS | 296 | AS | 509 | AS |

As indicated in Table 3, IE1, IE2, and CE1 all exhibit similar bond strengths. However, the failure mode is different for each example. Further, IE1 and IE2, which contain a polyol component comprising at least one butylene oxide-based polyol, surprisingly exhibited no tunneling after boil-in-bag testing. This is in contrast to the tunneling observed in CE1, which did not contain a butylene oxide-based polyol, after boil-in-bag testing.

TABLE 4

IE3, IE4, and CE2 Compositions

| Raw Material | IE3 | IE4 | CE2 |
|---|---|---|---|
| ADCOTE ™ L76-205 | 100 | | |
| ADCOTE ™ 88X102 | | 40 | 40 |
| ADCOTE ™ 88X116 | | 60 | 60 |
| ADCOTE ™ 796 | | | 32 |
| Prepolymer* | | 33 | |
| VORAPEL ™ T5001 | 10 | | |
| Ethyl Acetate | 60 | 23 | 27.8 |
| Substrates | mPET/Polyamide | Prelam AL/GF-19 | 92-LBT/GF-19 |

Illustrative Example 3 ("IE3")

100 grams of ADCOTE™ L76-205, 10 grams of VORAPEL™ T5001, and 60 grams of ethyl acetate are mixed to obtain a 50% solid solution. The solution is then applied to a metalized polyethylene terephthalate film at a coat weight of 1.7 lb/ream, and followed by laminating it with a polyamide film using a NORDMECCANICA™ LABO COMBI™ pilot laminator. The resulting laminate is left in a 60° C. oven for one hour before it is used as a primary substrate and the same adhesive is applied to the polyethylene terephthalate side of the laminate using the NORDMECCANICA™ LABO COMBI™, then laminated with a 4 mil low density polyethylene film. The bond strength between the polyethylene and the polyethylene terephthalate is measured immediately after the lamination and in intervals of one day, seven days, and fourteen days after the lamination. After fourteen days, pouches are made using the laminate structure and filled with a commercial softener. The pouches are then placed in an oven preset at 65° C. for thirty days before they are cut open, washed clean, and examined for failure modes. Bond strength of the laminate after the aging test is measured and recorded. Results on bond strength and failure mode of the laminate structure are summarized in Table 5.

Illustrative Example 4 ("IE4")

First a prepolymer for use in IE4 is prepared according to the following procedure. A lab glass reactor consisting of a 4-neck flask equipped with a mechanical stir and a temperature controller is used to produce the prepolymer. The prepolymer is based upon VORAPEL™ D3201 and VORAPEL™ T5001, both butylene oxide-based polyols. Under nitrogen purge, 1068.8 grams of ISONATE VORAPEL™ 125M pre-melted at 45° C. is first loaded to the flask. The reactor temperature is set to 50° C. With agitation on, 584.8 grams of VORAPEL™ T5001 is charged to the reactor, followed by addition of 146.2 grams of VORAPEL™ D3201. Cooling is applied by ice water bath if temperature of the reactor exceeds 85° C. After reacting at 80° C. for 4 hours, the prepolymer, with NCO content of 12.15%, is obtained.

Next, 33 grams of the prepolymer produced by the method described above, 40 grams of ADCOTE™ 88X102, 60 grams of ADCOTE™ 86X116, and 23 grams of ethyl acetate are mixed first to obtain a 50% solid solution. The solution is then applied to a metalized polyethylene terephthalate film at a coat weight of 1.7 lb/ream, and followed by laminating it with a polyamide film using a NORDMECCANICA™ LABO COMBI™ pilot laminator. The resulting laminate is left in a 60° C. oven for one hour before it is used as a primary substrate. The same adhesive is applied to the PET side of the laminate using the NORDMECCANICA™ LABO COMBI™, which is then laminated with a 4 mil low-density polyethylene film. The bond strength between the polyethylene and the polyethylene terephthalate is measured immediately after the lamination and in intervals of one day, seven days, and fourteen days after the lamination. After fourteen days, pouches are made using the laminate structure and filled with a commercial softener. The pouches are then placed in an oven preset at 65° C. for thirty days before they are cut open, washed clean, and examined for failure modes. Bond strength of the laminate after the aging test is measured and recorded. Results on bond strength and failure mode of the laminate structure are summarized in Table 5.

Comparative Example 2 ("CE2")

The solution is then applied to a metalized polyethylene terephthalate film at a coat weight of 1.7 lb/ream, and followed by laminating it with a polyamide film using a NORDMECCANICA™ LABO COMBI™ pilot laminator. The resulting laminate is left in a 60° C. oven for one hour before it is used as a primary substrate. The same adhesive is applied to the PET side of the laminate using the NORDMECCANICA™ LABO COMBI™, which is then laminated with a 4 mil low-density polyethylene film. The bond strength between the polyethylene and the polyethylene terephthalate is measured immediately after the lamination and in intervals of one day, seven days, and fourteen days after the lamination. After fourteen days, pouches are made using the laminate structure and filled with a commercial softener. The pouches are then placed in an oven preset at 65° C. for thirty days before they are cut open, washed clean, and examined for failure modes. Bond strength of the laminate after the aging test is measured and recorded. Results on bond strength and failure mode of the laminate structure are summarized in Table 5.

TABLE 5

Performance Results for IE3, IE4, and CE2

| | IE3 | | IE4 | | CE2 | |
|---|---|---|---|---|---|---|
| | Bond Strength (g/inch) | Failure Mode | Bond Strength (g/inch) | Failure Mode | Bond Strength (g/inch) | Failure Mode |
| Green Bond | 172 | AS | 138 | AS | 216 | AS |
| 1-day Bond | 1307 | FS | 2367 | FT | 1995 | FT |
| 7-day Bond | 616 | AS | 3037 | FT | 3003 | FT |
| 14-day Bond | 616 | AS | 3426 | FT | 3434 | FT |
| Softener | | | | | | |
| Appearance | No Tunneling | | No Tunneling | | No Tunneling | |
| Bond | 800 | AS | 569 | FT | 448 | AS |

As indicated in Table 5, IE3 exhibited good bond strength and no tunneling after softener testing. IE4 and CE2 exhibited comparable bond strength data and failure modes. IE4 exhibited no tunneling and significantly better bond strength than CE2 after the high temperature softener testing. Based upon this data, it was surprisingly found that inclusion of a butylene oxide-based polymer in one or both of the isocyanate component and polyol component of a two-component solvent-based adhesive composition improves chemical, and thermal resistance as well as hydrolytic stability of the adhesive.

The invention claimed is:

1. A two-component adhesive composition, comprising:
    an isocyanate component comprising at least one isocyanate; and
    a polyol component consisting of at least one butylene oxide-based polyol selected from the group consisting of polybutylene oxide-polypropylene oxide copolymer polyols, polybutylene oxide-polyethylene oxide copolymer polyols, and combinations thereof.

2. The composition of claim 1, wherein the at least one isocyanate is selected from the group consisting of aromatic polyisocyanates, aliphatic polyisocyanates, cycloaliphatic polyisocyanates, isocyanate prepolymers, and combinations of two or more thereof.

3. The composition of claim 1, wherein the at least one isocyanate is selected from the group consisting of 1,3- and 1,4-phenylene diisocyanate, 1,5-naphthylene diisocyanate, 2,6-tolulene diisocyanate, 2,4-tolulene diisocyanate (2,4-TDI), 2,4'-diphenylmethane diisocyanate (2,4'-MDI), 4,4'-diphenylmethane diisocyanate (4,4'-MDI), 3,3'-dimethyl-4,4'-biphenyldiisocyanate (TODI), polymeric isocyanates, and combinations of two or more thereof.

4. The composition of claim 1, wherein the at least one isocyanate is selected from the group consisting of cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexa methylene diisocyanate (TMDI), norbornane diisocyanate (NBDI), xylylene diisocyanate (XDI), tetramethylxylylene diisocyanate, and dimers, trimers, and combinations of two or more thereof.

5. The composition of claim 1, wherein the at least one isocyanate is selected from the group consisting of 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methyl-pentane, and combinations of two or more thereof.

6. The composition of claim 1, wherein the at least one isocyanate comprises a prepolymer which is the reaction product of a polyisocyanate and an isocyanate-reactive component.

7. The composition of claim 1, wherein the isocyanate-reactive component comprises at least one of a hydroxyl group, an amino group, a thio group, and combinations of two or more thereof.

8. The composition of claim 1, wherein the at least one butylene oxide-based polyol has a molecular weight of from 150 g/mol to 12,000 g/mol.

9. The composition of claim 1, wherein the at least one butylene oxide-based polyol comprises a functionality of from 1 to 6.

10. The composition of claim 1, further comprising an additive selected from the group consisting of a tackifier, a plasticizer, a rheology modifier, an adhesion promoter, an antioxidant, a filler, a colorant, a surfactant, a catalyst, a solvent, and combinations of two or more thereof.

11. The composition of claim 1, further comprising a solvent selected from the group consisting of methyl ethyl ketone, ethyl acetate, toluene, and combinations of two or more thereof.

* * * * *

UNITED STATES PATENT AND TRADEMARK OFFICE
CERTIFICATE OF CORRECTION

PATENT NO. : 11,746,265 B2  
APPLICATION NO. : 16/316912  
DATED : September 5, 2023  
INVENTOR(S) : Gelfer et al.

Page 1 of 1

It is certified that error appears in the above-identified patent and that said Letters Patent is hereby corrected as shown below:

In the Claims

Claim 4 – Column 14, Line 1, Replace "trimethylhexa methylene" with --trimethylhexamethylene--

Signed and Sealed this
Twenty-sixth Day of December, 2023

Katherine Kelly Vidal
*Director of the United States Patent and Trademark Office*